United States Patent
Bell et al.

(10) Patent No.: US 9,477,634 B2
(45) Date of Patent: Oct. 25, 2016

(54) I2C ADDRESS TRANSLATION

(75) Inventors: David B. Bell, Los Altos Hills, CA (US); Phillip J. Benzel, Pleasanton, CA (US)

(73) Assignee: INTERSIL AMERICAS LLC, Milpitas, CA (US)

(*) Notice: Subject to any disclaimer, the term of this patent is extended or adjusted under 35 U.S.C. 154(b) by 1248 days.

(21) Appl. No.: 13/046,610

(22) Filed: Mar. 11, 2011

(65) Prior Publication Data

US 2011/0302344 A1  Dec. 8, 2011

Related U.S. Application Data

(60) Provisional application No. 61/351,563, filed on Jun. 4, 2010.

(51) Int. Cl.
  *G06F 13/00* (2006.01)
  *G06F 13/42* (2006.01)

(52) U.S. Cl.
  CPC ................ *G06F 13/4291* (2013.01)

(58) Field of Classification Search
  CPC ............ G06F 13/364; G06F 13/366–13/368; G06F 13/00
  USPC ........... 710/311, 110, 107, 305–306
  See application file for complete search history.

(56) References Cited

U.S. PATENT DOCUMENTS

| | | | | |
|---|---|---|---|---|
| 7,123,618 B2* | 10/2006 | Ido et al. | ...... | 370/394 |
| 7,689,756 B2* | 3/2010 | Ellison | ...... | 710/311 |
| 2007/0055793 A1* | 3/2007 | Huang et al. | ...... | 710/8 |

FOREIGN PATENT DOCUMENTS

| | | |
|---|---|---|
| CN | 1382277 A | 11/2002 |
| CN | 101211318 A | 7/2008 |
| CN | 101295283 A | 10/2008 |

OTHER PUBLICATIONS

UM10204, The I2C Bus Specification and User Manual, Rev. Jun. 3-19, 2007, NXP B.V., 50 pages.
AN262_2, PCA954X Family of I2C/SMBus Multiplexers and Switches, Phillips Semiconductors, Oct. 27, 2004, pp. 1-27.
TPIC2810, *-Bit LED Driver with I2C Interface, Texas Instruments, Revised Sep. 2002.
I2C, Wikiipedia, http://en.wikipedia.org/wiki/I%C2%B2C, accessed Mar. 11, 2011.

(Continued)

*Primary Examiner* — Tim T Vo
*Assistant Examiner* — Kim T. Huynh
(74) *Attorney, Agent, or Firm* — Vierra Magen Marcus LLP (57) ABSTRACT

Embodiments of the present invention relate to systems, devices and methods for translating I2C addresses. In accordance with an embodiment, a method for translating an I2C address includes receiving an original I2C address from a first I2C compatible device via an I2C-bus to which the first I2C compatible device is connected. The method also includes translating the original I2C address to a translated I2C address, and outputting the translated I2C address to a second I2C compatible device via a secondary side of the I2C-bus to which the slave device is connected. The original I2C address can be translated to the translated I2C address by subtracting an offset value from (or adding an offset value to) the original I2C address to produce the translated I2C address. Such an offset value can be specified using pin strapping, or by storing the offset value in a register or non-volatile memory that is programmable via the—I2C bus. Alternatively, a look-up-table, that is programmable via the I2C-bus, can be used to perform the I2C address translation.

24 Claims, 8 Drawing Sheets

(56) References Cited

OTHER PUBLICATIONS

Amendment dated Jun. 4, 2013, in Chinese Patent Appl. No. 201110158929.3 filed May 30, 2011.
Office Action dated May 18, 2015, in Taiwanese Patent Appl. No. 100115735 filed May 5, 2011.
Amendment dated Jul. 29, 2015, in Taiwanese Patent Appl. No. 100115735 filed May 5, 2011.
Notice of Allowance dated Aug. 20, 2015, in Taiwanese Patent Appl. No. 100115735 filed May 5, 2011.
Office Action dated Jun. 17, 2015, in Chinese Patent Appl. No. 201110158929.3 filed May 30, 2011.
Amendment dated Jul. 13, 2015, in Chinese Patent Appl. No. 201110158929.3 filed May 30, 2011.
Notice of Allowance dated Nov. 12, 2015, in Chinese Patent Appl. No. 201110158929.3 filed May 30, 2011.
Office Action dated Jan. 26, 2015, in Chinese Patent Appl. No. 201110158929.3 filed May 30, 2011.
Amendment dated Mar. 24, 2015, in Chinese Patent Appl. No. 201110158929.3 filed May 30, 2011.

* cited by examiner

I2C ADDRESS TRANSLATION

PRIORITY CLAIM

This application claims priority under 35 U.S.C. 119(e) to U.S. Provisional Patent Application No. 61/351,563, entitled I2C ADDRESS TRANSLATOR, filed Jun. 4, 2010, which is incorporated herein by reference.

BACKGROUND

Figure 1:
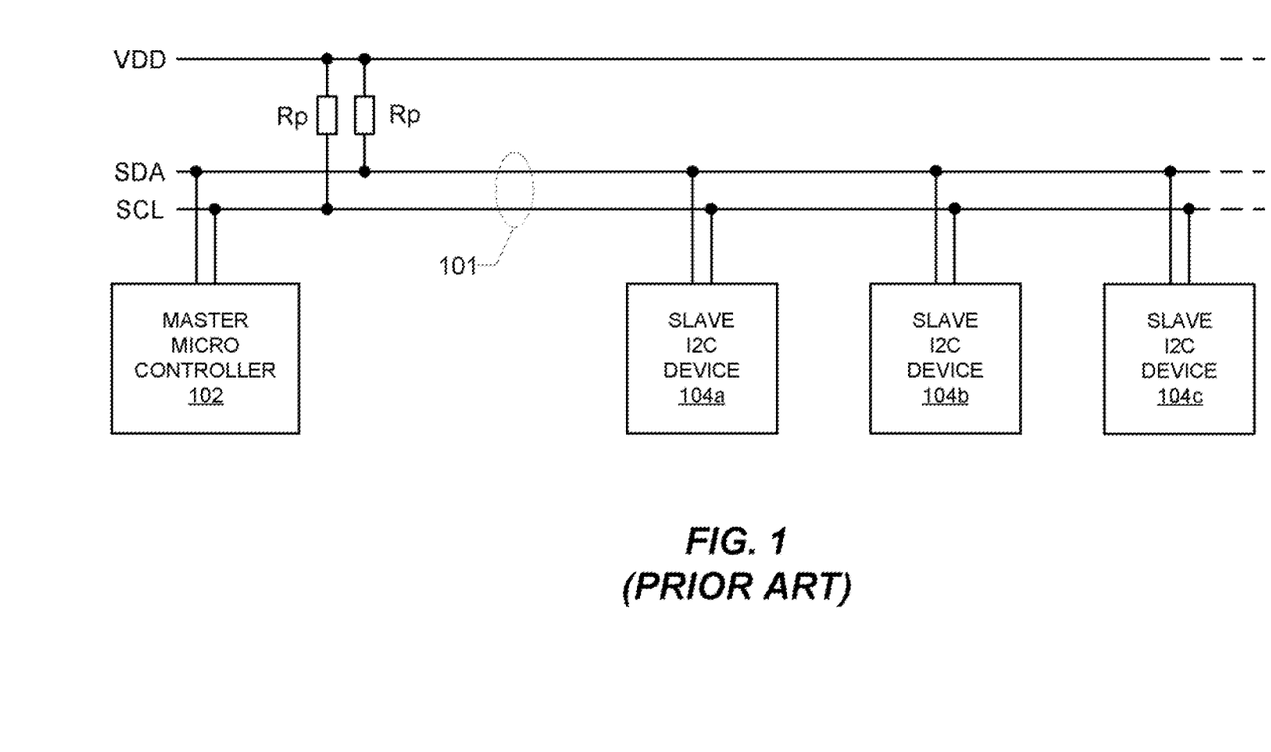
FIG. 1 is a high level block diagram that is used to explain how I2C compatible devices conventionally communicate with one another using in I2C-bus.

An Inter-Integrated Circuit bus (I2C-bus) is a serial bus that is often used to attach low-speed peripherals within or to a motherboard, embedded system, or cellphone. As shown in FIG. 1, an I2C-bus 101 includes only two bi-directional bus lines, which include a serial data line (SDA) and a serial clock line (SCL). As also shown in FIG. 1, a pull-up resistor (Rp) is connected between each bus line and a supply voltage rail (VDD). Typical voltages used for VDD are +5 V or +3.3 V, although systems with other (e.g., higher or lower) supply voltage rail voltages are permitted. The pull-up resistors (Rp) pull both the SDA and SCL lines HIGH when the bus is free. In FIG. 1, one master device 102 (e.g., a microcontroller) and three slave devices 104 (individually labeled 104a, 104b and 104c) are shown as being connected to the I2C-bus 101.

Electronic systems increasingly use integrated circuits (ICs) interconnected by an I2C-bus. Such ICs, because of their compatibility with the I2C-bus, are often referred to as I2C compatible chips, or more generally, I2C compatible devices. Exemplary I2C compatible devices include, but are not limited to, microcontrollers, liquid crystal displays (LCDs), LED drivers, input/output ports, random access memory (RAM), analog-to-digital converters (ADCs), digital-to-analog converters (DACs), temperature sensors and digital signal processors (DSPs). The output stages of such I2C compatible devices, which are open-drain or open-collector, can be used to selectively pull down the SDA and SCL lines, to thereby provide data and clock signals.

There are four potential modes of operation for a given I2C compatible device, although most devices only use a single role (master or slave) and its two modes (transmit and receive). These modes include: master transmit—master device is sending data to a slave; master receive—master device is receiving data from a slave; slave transmit—slave device is sending data to a master; and slave receive—slave device is receiving data from the master.

The master is initially in master transmit mode by sending a start bit followed by the 7-bit address (which can be referred to as an I2C address) of the slave it wishes to communicate with, which is followed by a single read/write bit representing whether it wishes to read from (1) or write to (0) the slave. The start bit informs all of the ICs connected to the bus to listen to the bus for an incoming address. When each IC receives the address, the IC will compare it with its own address. If the received address doesn't match the IC's address, then the IC knows it is not being addressed. If the received address matches the IC's address, then the IC knows it is being addressed, in response to which the IC produces an acknowledgement (ACK) bit (active low for acknowledged). In other words, if the addressed slave exists on the bus, then it will respond with an ACK bit for that address. The master then continues in either transmit or receive mode (according to the read/write bit it sent), and the slave continues in its complementary mode (receive or transmit, respectively). The address and the data bytes are sent most significant bit first. The start bit is indicated by a high-to-low transition of SDA with SCL high; the stop bit is indicated by a low-to-high transition of SDA with SCL high. If the master device wishes to write to the slave device then it repeatedly sends a byte with the slave sending an ACK bit (in this situation, the master is in master transmit mode and the slave is in slave receive mode). If the master device wishes to read from the slave device then it repeatedly receives a byte from the slave, the master sending an ACK bit after every byte but the last one (in this situation, the master is in master receive mode and the slave is in slave transmit mode). The master then ends transmission with a stop bit, or it may send another START bit if it wishes to retain control of the bus for another transfer (a "combined message").

For the purpose of this description, the bits transmitted by a master, which includes a start bit followed by a 7-bit address, followed by a read/write bit, can be referred to as a read command or a write command, depending on the read/write bit.

Because only 7 bits can be used to designate the address of the slave, there are only $2^7$ (i.e., 128) possible addresses. However, since 16 addresses are reserved, conventionally a maximum of 112 different devices can be address (i.e., 128−16=112).

In some cases, multiple applications of the same IC are desired, which means many of the same ICs (e.g., multiple instances of the same peripheral IC) may be attached to the same I2C-bus. However, because each device must have a unique I2C address, using multiple ICs with the same I2C address can result in data corruption. The most common solution to this potential problem is to design peripheral I2C-compatible devices with several selectable addresses. For example, an I2C compatible device may include two pins that are dedicated to selecting the address of the device, and thus, that enables the device to be assigned one of four different addresses. However, if the number of identical devices exceeds the number of selectable addresses (four, in this example), the same address overlap problem exists. From a cost and space perspective, it would not be practical to simply keep adding more pins that are dedicated to selecting the address of the device.

There are hundreds of different I2C compatible devices that are currently being manufactured. While some may be designed to have several selectable addresses, other are designed with a fixed address. Because only 112 different device addresses are available, it is quite likely that two different ICs that provide completely different functionality can have the same address and be attached to the same I2C-bus. This can prevent such two ICs from being separately addressable, since each device must have a unique I2C address. If two different ICs have the same address and are connected to the same I2C-bus, this also can result in data corruption.

There are presently no convenient solutions to the above described I2C addressing limitations. The most common solution is to create another independent I2C-bus with another full set of addresses, but this requires another I2C port on the master controller, which is undesirable.

SUMMARY

Embodiments of the present invention relate to systems, devices and methods for translating I2C addresses. Such systems, devices and methods can be used to overcome at least some of the aforementioned limitations associated with addressing I2C compatible devices.

In accordance with certain embodiments, a method for translating an I2C address includes receiving an original I2C address from a first I2C compatible device (e.g., a master device) via a main side of an I2C-bus to which the first I2C compatible device is connected. The method also includes translating the original I2C address to a translated I2C address, and outputting the translated I2C address to a second I2C compatible device (e.g., a slave device) via a secondary side of the I2C-bus to which the second I2C compatible device is connected. In certain embodiments, at least a portion of the translating and at least a portion of the outputting of the translated I2C address are performed before the entire original I2C address is received. The original I2C address can be translated to the translated I2C address by subtracting (or adding) an offset value from (or to) the original I2C address to produce the translated I2C address. Such an offset value can be specified using pin strapping or by storing the offset value in a manner that enables the offset value to be programmable via the I2C-bus. Alternatively, the original I2C address can be translated to the translated I2C address using a look-up-table that is programmable via the I2C-bus. In specific embodiments, such methods can be performed by an I2C address translator.

Other methods can be performed by a master device, where such methods enable the master device to separately send commands to two I2C compatible devices (e.g., two slave devices of the same or different type) that both have a first address (i.e., a same address), wherein a first one of the two I2C compatible devices and the master device are connected to a first side of an I2C-bus, and a second one of the two I2C compatible devices is connected to a second side of the I2C-bus. Such a method can include sending a first command to the first one of the two I2C compatible devices, which is attached to the first side of an I2C-bus, by including the first address in the first command. The method can also include sending a second command to the second one of the two I2C compatible devices, which is attached to the second side of the I2C-bus, by including a second address in the second command, wherein the second address in the second command is translated to the first address before the second one of the two I2C compatible devices receives the second command.

In accordance with an embodiment, an I2C address translator includes circuitry configured to receive an original I2C address via an I2C-bus, and circuitry configured to translate the received original I2C address to a translated I2C address. Additionally, the I2C address translator includes circuitry configured to output the translated I2C address via a secondary side of the I2C-bus. The circuitry configured to translate the received original I2C address to a translated I2C address can include circuitry that subtracts an offset value from (or adds the offset value to) the original I2C address to thereby generate the translated I2C address. Such circuitry can also include circuitry, such as a register, that stores the offset value, and enables the offset value to be programmed. In alternative embodiments, the circuitry configured to translate the received original I2C address to a translated I2C address includes a programmable look-up-table that stores one or more original I2C addresses and a translated address for each of the one or more original I2C addresses.

A system, according to an embodiment of the present invention, can include a main side of an I2C-bus, with a plurality of devices connected to the main side of the I2C-bus. Additionally, the system can include a secondary side of the I2C-bus, with a plurality of devices connected to the secondary side of the I2C-bus. An I2C address translator is connected between the main side of the I2C-bus and the secondary side of the I2C-bus. The I2C address translator is configured to receive an original I2C address via the main side of the I2C-bus from one of the devices connected to the main side of the I2C-bus. Additionally, the I2C translator is configured to translate the original I2C address to a translated I2C address, and to transmit the translated I2C address via the secondary side of the I2C-bus so that the translated I2C address can be received by one of the devices connected to the secondary side of the I2C-bus.

This summary is not intended to summarize all of the embodiments of the present invention. Further and alternative embodiments, and the features, aspects, and advantages of the embodiments of invention will become more apparent from the detailed description set forth below, the drawings and the claims.

DETAILED DESCRIPTION

Figure 2:
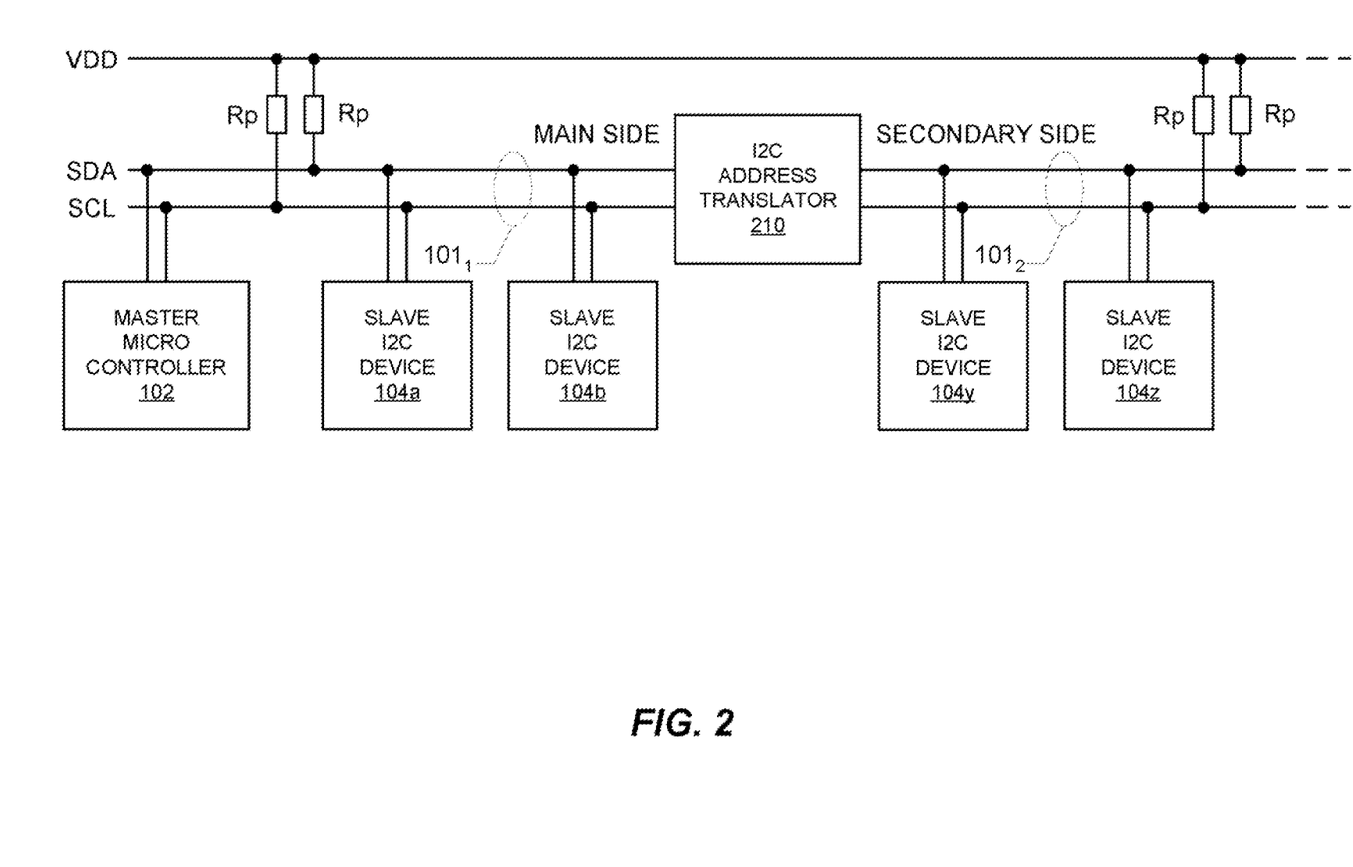
FIG. 2 is a high level block diagram that is used to explain how an I2C address translator, according to an embodiment of the present invention, connects to a main I2C-bus on one side, and creates a secondary I2C-bus on the other side.

Specific embodiments of the present invention relate to an I2C address translator, which can be implemented as an integrated circuit (IC), or in a microcontroller with firmware, but is not limited thereto. Referring to FIG. 2, an I2C address translator 210, according to an embodiment of the present invention, connects to a main I2C-bus $101_1$ (also simply referred to as an I2C-bus) on one side (where the bus master 102 resides, and a first plurality of slave peripheral devices 104a and 104b reside), and creates a secondary I2C-bus $101_2$ on the other side (connecting to a second plurality of slave peripheral devices 104y and 104z). Since the I2C address translator 210 is essentially extending the main I2C-bus $101_1$, the main I2C-bus can also be referred to as a main side of a I2C-bus, and the secondary I2C-bus $101_2$ created by the I2C address translator 210 can also be referred to as a secondary side of the I2C-bus.

In accordance with certain embodiments, the I2C address translator 210 can be programmed to translate I2C addresses such that a master device can separately communicate with (e.g., send commands to) a pair of I2C compatible devices having the same I2C address. Additional details of how this can be done are provided below with reference to FIGS. 3, 4 and 5, within which the different embodiments of the I2C address translator 210 are labeled 210a, 210b and 210c, respectively.

By translating I2C addresses, in accordance with an embodiment of the present invention, pairs of I2C compatible devices having the same address can be separately addressed, so long as one of a pair is connected to the main side of the I2C-bus $101_1$, and the other one of the pair is connected to the secondary side of the I2C-bus $101_2$. For example, assume a first I2C compatible device (e.g., a DAC) has the 7 bit binary address 0101111, and a second I2C compatible device (e.g., an LED driver) also has the 7 bit binary address 0101111. If the I2C address translator 210 is programmed to subtract an offset value of four (i.e., binary 100), then a master device (e.g., 102) located on the main side of the I2C-bus $101_1$ can address the first I2C compatible device (e.g., the DAC) using the binary address 0101111; and the master device can (e.g., 102) address the second I2C compatible device (e.g., the LED driver) located on the secondary side of the I2C-bus $101_2$ using the binary address 0110011 (which is equal to binary 0101111 plus binary 100). In this manner, when the I2C address translator 210 receives the binary address 0110011 from the master device (e.g., 102) on the main side of the I2C-bus $101_1$, the I2C address translator 210 will output the binary address as 0101111 on the secondary side of the I2C-bus $101_2$ thereby enabling the second I2C compatible device (e.g., the LED driver) located on the secondary side to be addressed.

In the example that was just described the first and second I2C compatible devices that shared a common address were different types of devices, e.g., one was a DAC with the other was an LED driver. Alternatively, the first and second I2C compatible devices can be the same exact type of device, e.g., two instances of the same exact type of DAC having the same part number.

Another use of the I2C address translator 210 is as follows. Assume a specific I2C compatible device includes two pins dedicated to selecting the address of the device, and thus, enables the device to be assigned one of four different addresses. Without the use of an I2C address translator 210 of an embodiment of the present invention, four instances of that specific I2C compatible device can each be attached to the same I2C-bus by using the two pins to assign each of the four devices a different one of the four different addresses. But if a fifth instance of the specific I2C compatible device was attached to that I2C-bus, then two of the specific I2C compatible devices would need to share the same address (since only four different addresses are possible), which can result in data corruption. However, if an I2C address translator 210 of an embodiment of the present invention were used, then up to eight instances of the specific I2C compatible can be separately addressed. More specifically, the I2C address translator 210 can be used to demarcate a main side of an I2C-bus from a secondary side of an I2C-bus. This enables four instances of that specific I2C compatible device to be attached to the main side of the I2C-bus (by using the two pins to assign each of the four devices a different one of the four different addresses), and four more instances of that specific I2C compatible device to be attached to the secondary side of the I2C-bus (by again using the two pins to assign each of the four devices a different one of the four different addresses). Continuing with this example, assume that the I2C address translator 210 performs an I2C address translation by subtracting an offset value from a received I2C address, e.g., as described below with reference to FIGS. 3 and 4. A master device connected to the main side of the I2C-bus $101_1$ can use four separate original I2C addresses to write to and read from the four instances of the specific I2C compatible device connected to the main side of the I2C-bus $101_1$, and the master device can use four separate additional I2C addresses to write to and read from the four instances of the specific I2C compatible device connected to the secondary side of the I2C-bus $101_2$. In this example, the four separate additional I2C addresses (used to address the four instances of the specific I2C compatible device connected to the secondary side of the I2C-bus $101_2$) would equal the four separate original I2C addresses plus the offset value.

Various different embodiments of the I2C address translator will now be described with reference to FIGS. 3, 4 and 5. As mentioned above, in FIGS. 3, 4 and 5 the different embodiments of the I2C address translator 210 are labeled 210a, 210b and 210c, respectively. While various configurations for the I2C address translator 210 are described herein, one of ordinary skill in the art would appreciate that further embodiments are also possible that would be within the spirit and scope of the present invention.

Figure 3:
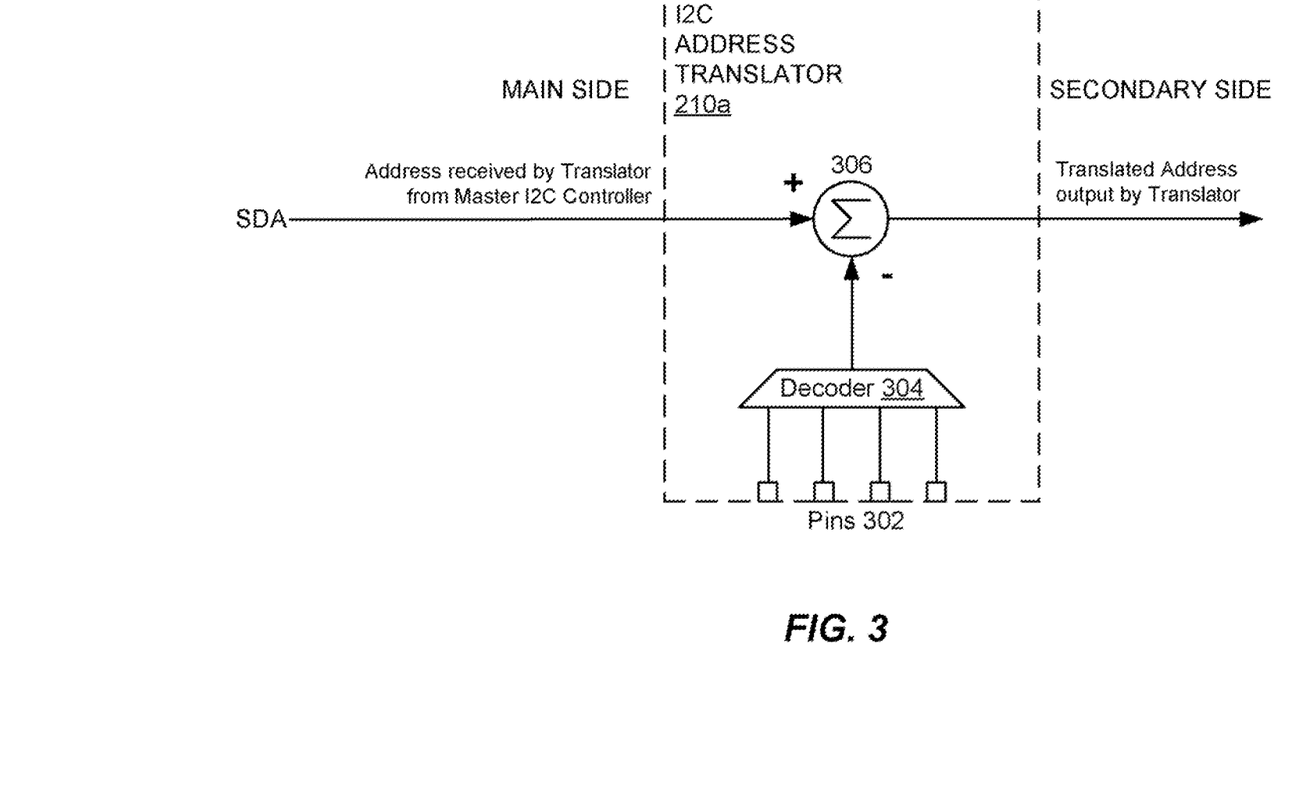
FIGS. 3-5 illustrate various embodiments of the present invention for programming the I2C address translator introduced in FIG. 2.

Referring to FIG. 3, in certain embodiments, the I2C address translator 210a could be programmed by external pins (e.g., be pin-strapped) to subtract an offset value (e.g., 1, 2, 4, 8, or some other value) from the address supplied by the I2C master (102 in FIG. 2). For example, referring to the high level diagram of FIG. 3, each of the four pins 302 can be selectively connected to ground or a supply voltage rail (e.g., VDD) to select, via a decoder 304, an offset value that is subtracted by a summer 306 from the address value received from the I2C master, to thereby produce the translated address. By proper configuration of the translator 210a, the addresses of peripheral ICs attached to the secondary side of the I2C-bus can be mapped to addresses in the I2C address space that are not used by the main side of the I2C-bus. It is also noted that other types of terminals, besides pins, can be similarly used to program an offset value for use by an I2C address translator 210.

In other embodiments, the I2C address translator 210 could be programmed, e.g., via EEPROM (Electrically Erasable Programmable Read-Only Memory), OTP (One Time Programmable) memory, or the like, which could be written to by an end user by addressing the translator 210 via a microcontroller (e.g., 102 in FIG. 1) using the main I2C-bus and writing address translation information to the translator 210. This can be achieved by assigning the translator 210 a unique 7 bit address, similar to present standard I2C devices, and could be controlled accordingly.

In certain embodiments, translation information can be programmed as an offset used to generate a translated I2C address. For example, referring to the high level diagram of FIG. 4, a standard I2C controller 402 can be used to write an offset value to a register 404 in response to the I2C address translator 210b being addressed and written to. Thereafter, when the translator 210b is not specifically addressed, a summer 406 subtracts the value stored in the register 404 from the address value received from the I2C master via the main side of the I2C-bus, to thereby produce the translated address that is output via the secondary side of the I2C-bus. Such an offset value can alternatively be stored in other manners that enable the offset value to be programmable. For example, an offset value can be stored in non-volatile memory of the I2C address translator 210, wherein the non-volatile memory is programmable via an I2C bus to which the I2C address translator 210 is connected.

Figure 4:
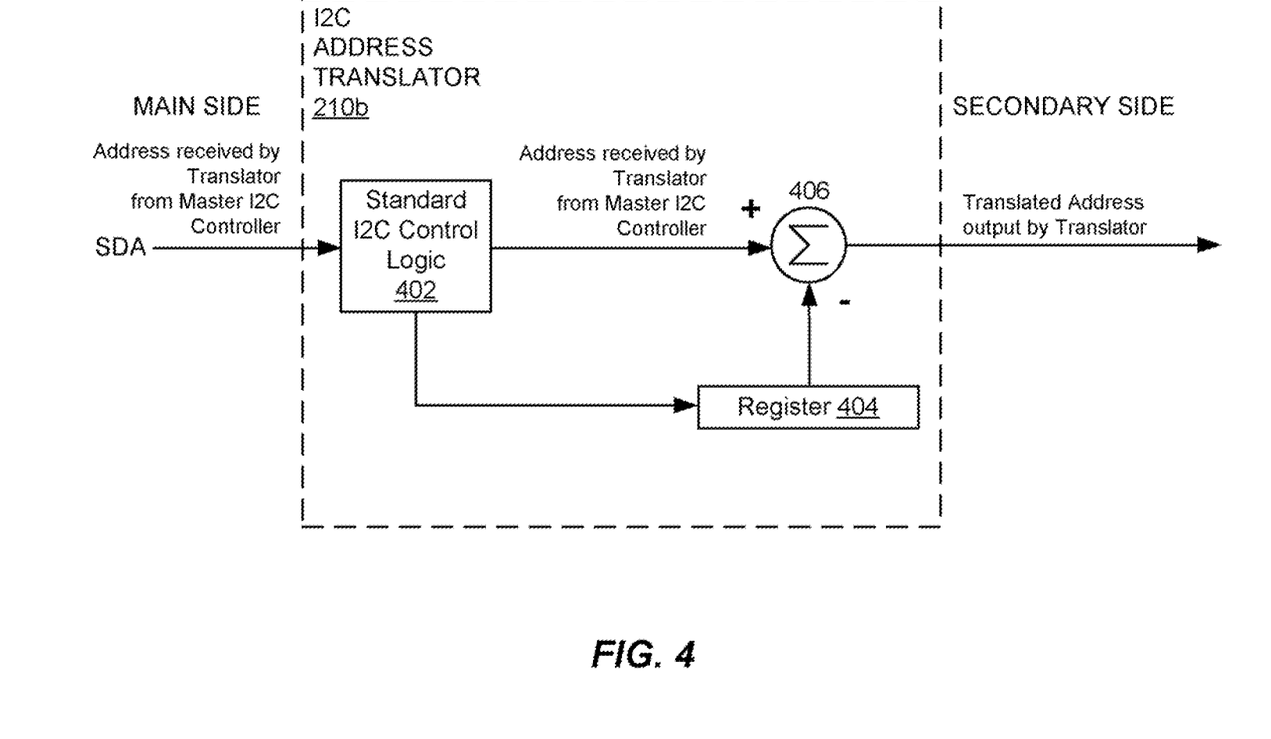
Figure 5:
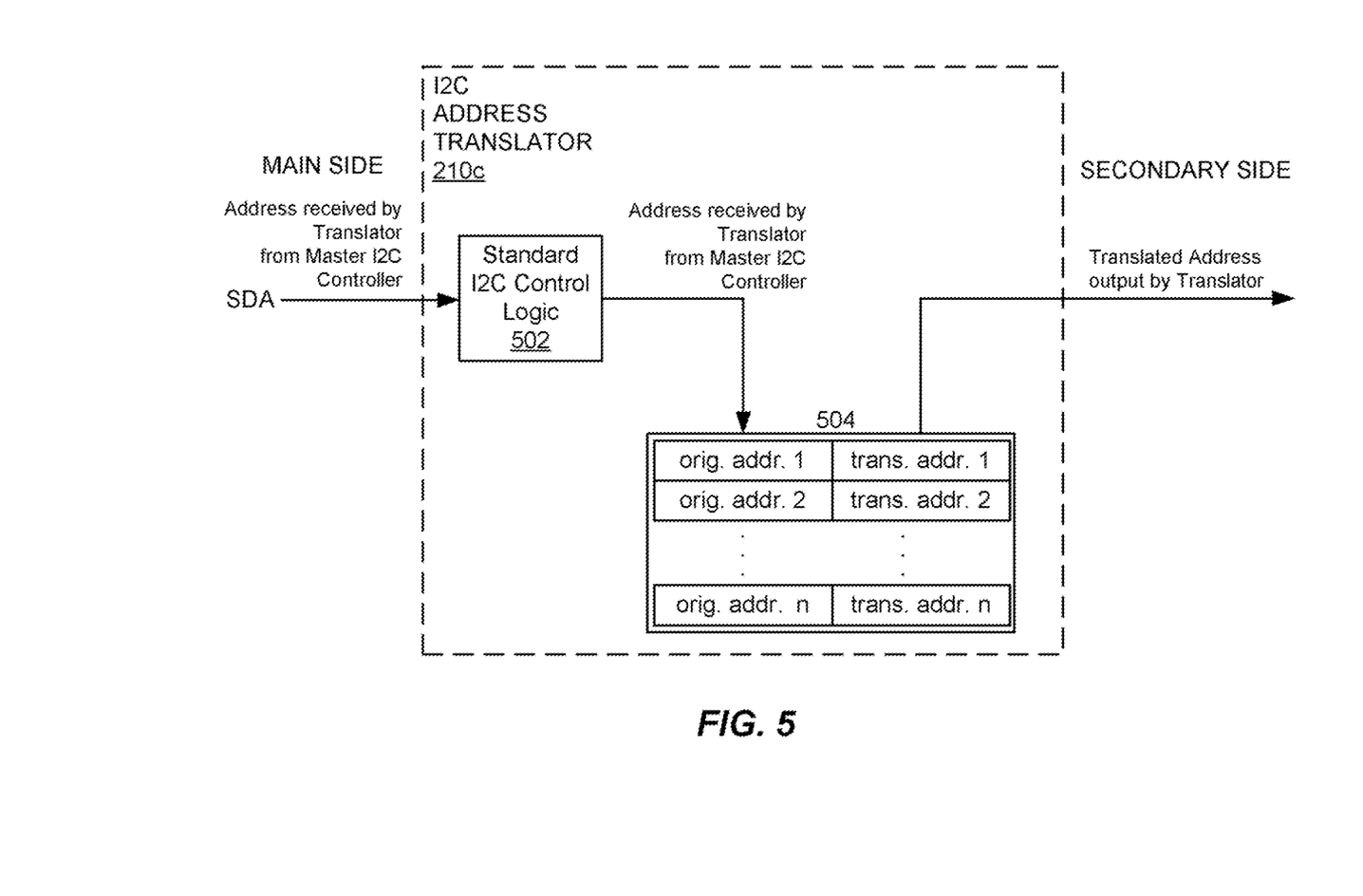

In FIGS. 3 and 4 the summers 306 and 406 were described as being used to subtract an offset value from a received address. Accordingly, the summers 306 and 406 could have been referred to as "differencers" or "subtractors". In alternative embodiments, the summers (e.g., 306 and 406) can be used to add an offset value to a received address. It is noted that overflow can occur if the sum of a received address and the offset value exceed the maximum address (e.g., exceed 1111111). Similarly, where the address translator is subtracting an offset value, underflow can occur where a received address minus an offset value is a negative number. Accordingly, care should be taken to understand how overflow and/or underflow may affect address translations.

In other embodiments, a translation algorithm or a lookup table can be used to achieve remapping of secondary slave addresses to non-used addresses on the main side of the I2C-bus. For example, referring to FIG. 5, a standard I2C controller 502 can be used to program a translated value for each of a plurality of addresses in a look-up-table 504 (e.g., stored in a plurality of registers, but not limited thereto). Thereafter, when the I2C address translator 210c is not specifically addressed, if an address in the look-up-table 504 is received by the I2C address translator 210c, the I2C address translator 210c outputs the corresponding translated address via the secondary side of the I2C-bus.

The embodiments for the I2C address translator 210 generally described with reference to FIGS. 2-5 can involve programming upon initial product manufacturing or initial power up sequencing. In accordance with certain embodiments, prior to performing this programming operation, the slave devices on the secondary bus are not addressable and are disabled.

The I2C address translator 210 can use hardware to translate addresses. Additionally, or alternatively, the I2C address translator 210 can use firmware and/or software to translate addresses. For example, the I2C address translator 210 can include firmware that uses an algorithm to perform an address translation. Such an algorithm can be as simple as specifying that a translated address is equal to an original address minus an offset value. However, alternative types of algorithms can be used while still being within the scope of the present invention. For another example, the algorithm can specify that a first offset value is used if the original address is within a first range, and a second offset value is used if the original address is within a second range. It is also possible that the algorithm use other functions besides subtraction, e.g., addition can be used. It is also within the scope of an embodiment of the present invention that an algorithm use multiplication and/or division, but use of such functions is more complex than using subtraction and/or addition.

The embodiments for the I2C address translator generally described with reference to FIGS. 2-5 showed the I2C address translator receiving an address from the I2C master via the main SDA line of the main side of the I2C-bus, and outputting a translated address via the secondary SDA line of the secondary side of the I2C-bus. However, the I2C address translator can also receive the SCL line, and as will be described below, can in certain embodiments exert control over the SCL line.

Figure 6:
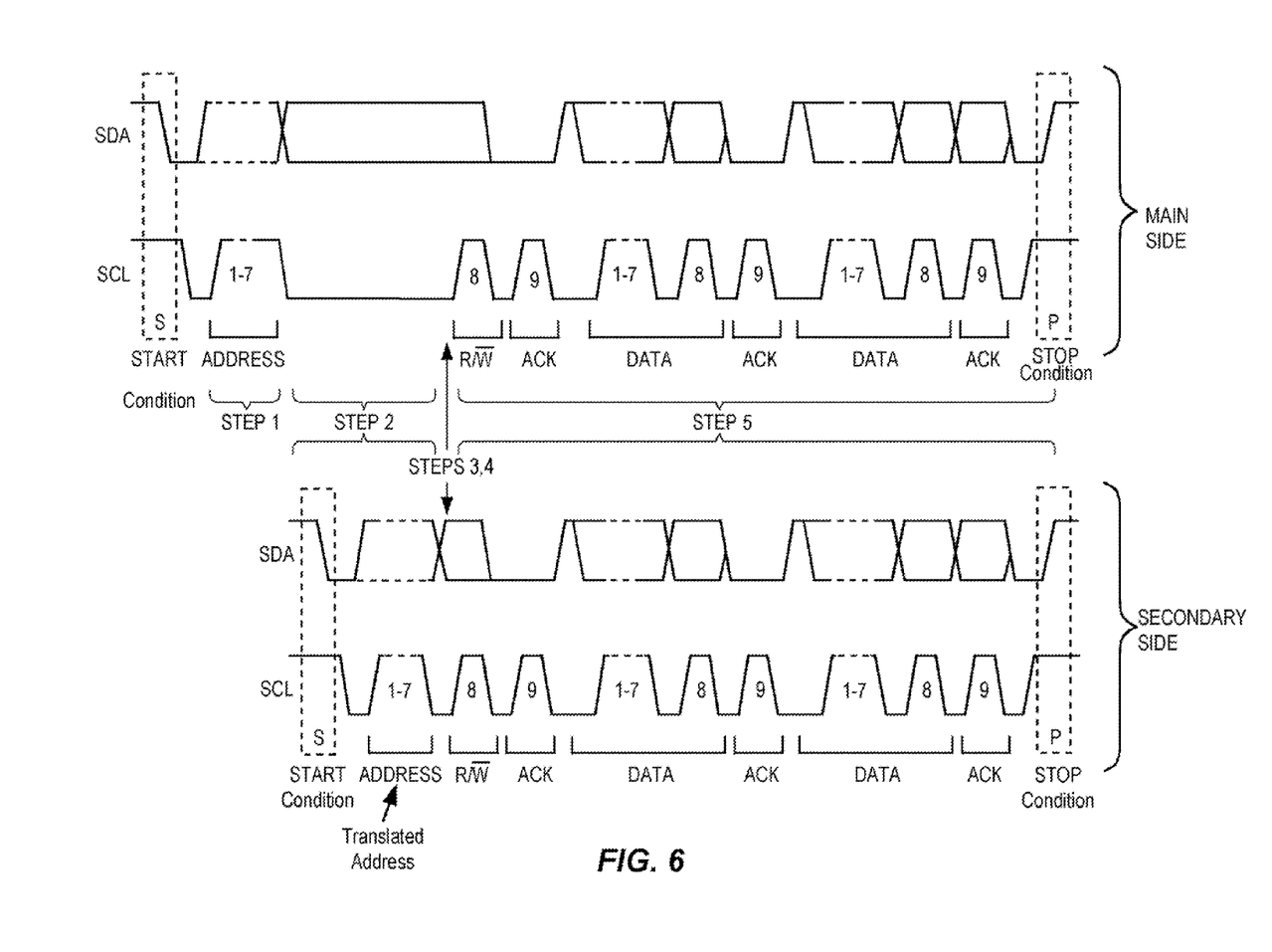
FIG. 6 is an exemplary timing diagram used to show how an I2C address translator could utilize the synchronization feature of the I2C-bus to perform address translation in a transparent and specification-compliant manner.

The I2C address translator could utilize the synchronization feature of the I2C-bus to perform address translation in a completely transparent and specification-compliant manner. A sequence, according to a specific embodiment, is shown below:

Step 1: The I2C address translator (e.g., 210) accepts the seven I2C address bits from the master (e.g., 102) as would any attached slave IC. The I2C address translator output remains inactive (SDA and SCL outputs high).

Step 2: Once the seven address bits have been accepted (e.g., temporarily stored) by the I2C address translator, the SCL line on the main side is held low by the I2C address translator. At this point, the address is translated (e.g., an offset value is subtracted from the stored address), and it is driven out serially on the secondary side. Bus activity on the main side is suspended while the SCL line is held low by the I2C address translator.

Step 3: Once the translated address has been completely shifted out on the slave side, the SDA line on the secondary side is logically connected to the SDA line on the main side.

Step 4: After a brief delay, the SCL line on the slave side is released and logically connected to the SCL line on the main side. This will result in the SCL lines on both sides of the I2C address translator going high.

Step 5: At this point, the SCL and SDA lines on the main side of the I2C address translator are logically connected to the SCL and SDA lines on the secondary side. The rest of the I2C transaction completes in transparent fashion, as if the I2C address translator was simply replaced by wires (but potentially with a slight time delay due to optional buffer circuitry within the I2C address translator).

FIG. 6 shows an exemplary timing diagram for the process described above. It is also possible for the I2C address translator to adjust the address transfer speed on the slave side to roughly match that of the master. Measuring the clock frequency during the initial master address transmission provides the necessary information to adjust the I2C address translator's internal clock to roughly match the clock frequency when the slave address is transmitted.

In certain embodiments the I2C address translator 210 can be configured to perform a translation using an offset that is limited to values of $2^N$ (where N=1, 2, 3, 4, 5 or 6). In such embodiments, it is possible for the I2C address translator 210 to begin an address translation before receiving all seven address bits from the master, and to begin outputting a portion of the translated address on the secondary side of the I2C-bus before receiving all seven address bits and/or completing the address translation. Doing this could reduce the wait time for the slave connected to the secondary side of the I2C bus to respond when compared to the main side bus timing. In other words, if a translation offset value is a binary weighted $2^N$ value, there will be instances where the most significant bits (MSBs) of the translated address can begin to be shifted out of the address translator 210 prior to the address translator 210 receiving the full 7 bit I2C address (from the master) that is to be translated. This is because if the least significant bits (LSBs) of the offset value are zeros, then any subtraction or addition of the offset value does not affect at least some of the LSBs of the I2C address to be translated. For a specific example, assume that the offset value is decimal 32 (i.e., $2^5=32$), which is binary 0100000. Also assume that the master is writing to decimal address 53, which is binary address 0110101. Assuming that the I2C address translator 210 subtracts the offset value from the I2C address received from the master, then the translated address will be 53−32=21, which is binary 0010101. Note that the five LSBs of the I2C address are not affected by the translation, and more specifically, the translation did not change once the two MSB's were received by the I2C address translator 210. Accordingly, the address translation (achieved through subtraction in this example) could be completed and a portion of the resulting translated address could begin to be shifted out of the I2C address translator 210 (onto the secondary side of the I2C-bus) prior to the I2C address translator 210 receiving the entire I2C address to be translated (in this example, prior to the address translator 210 receiving the five LSBs of the address to be translated).

Figure 7:
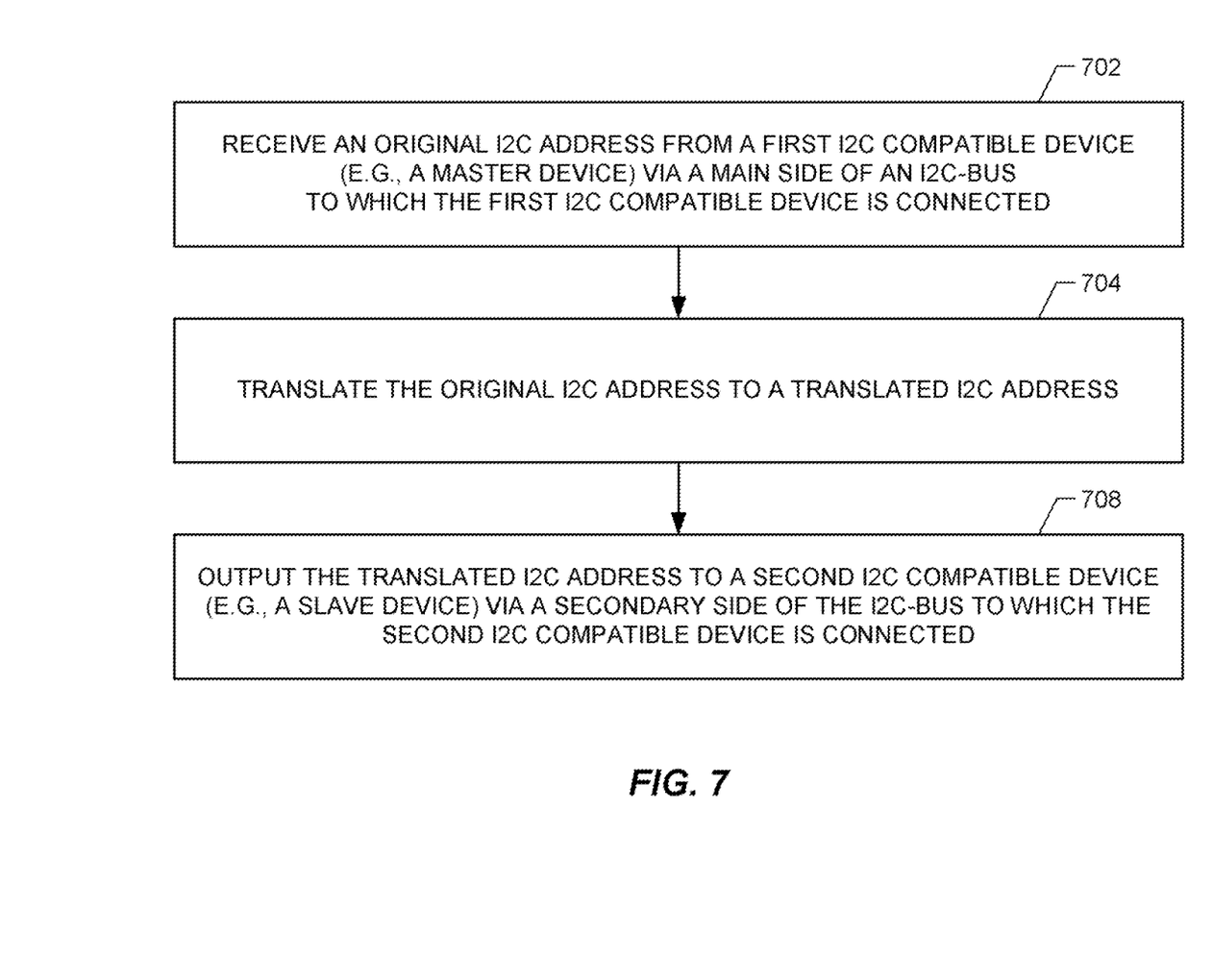
FIG. 7 is a high level flow diagram that is used to summarize a method, for use by an I2C translator, for translating an I2C address in accordance with an embodiment of the present invention.

FIG. 7 is a high level flow diagram that is used to summarize a method, for use by an I2C translator, for translating an I2C address in accordance with an embodiment of the present invention. Referring to FIG. 7, at a step 702 an original I2C address is received from a first I2C compatible device via a main side of an I2C-bus to which the first I2C compatible device is connected. At a step 704, the original I2C address is translated to a translated I2C address. At a step 706, the translated I2C address is output to a second I2C compatible device (e.g., a slave device) via a secondary side of the I2C-bus to which the second I2C compatible device is connected.

In accordance with an embodiment, the address translation at step 704 is performed by subtracting (or adding) an offset value from the original I2C address to produce the translated I2C address. The offset value can be specified using one or more terminals (e.g., pins), wherein each terminal is selectively connected to a supply voltage rail or ground, e.g., as described with reference to FIG. 3. Alternatively, the offset value can be stored in a register or non-volatile memory, e.g., as was described above with reference to FIG. 4. Such a stored offset value can be programmable via the I2C-bus, as was also described above with reference to FIG. 4. In an alternative embodiment, the address translation at step 704 is performed using a look-up-table, e.g., as was described above with reference to FIG. 5. Such a look-up-table can be programmable via the I2C-bus, as was also described above with reference to FIG. 5. It also within the scope of the present invention that the address translation at step 704 is performed using algorithms other than simple subtraction or addition, as was explained above.

Figure 8:
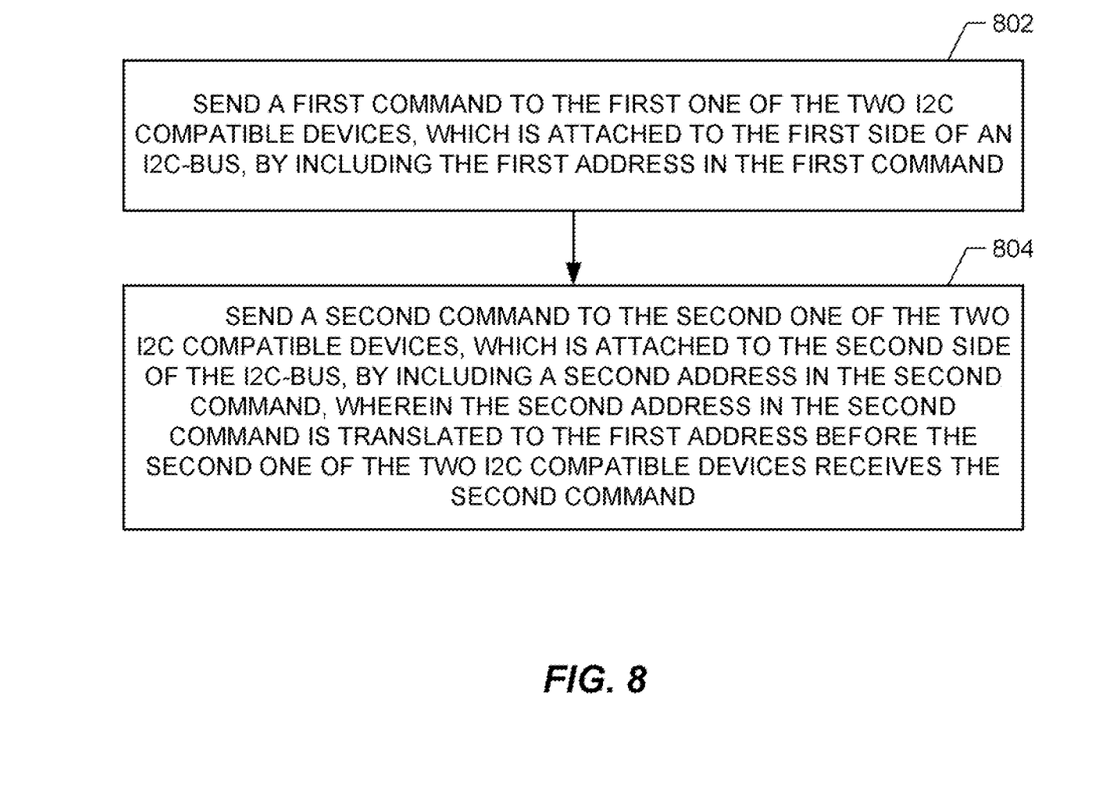
FIG. 8 is a high level flow diagram that is used to summarize a method, for use by a master device, that enables the master device to separately send commands to two I2C compatible devices that both have a same address, wherein a first one of the two I2C compatible devices and the master device are connected to a first side of an I2C-bus, and a second one of the two I2C compatible devices is connected to a second side of the I2C-bus.

FIG. 8 is a high level flow diagram that is used to summarize a method, for use by a master device, that enables the master device to separately send commands to two I2C compatible devices that both have a same address, wherein a first one of the two I2C compatible devices and the master device are connected to a first side of an I2C-bus, and a second one of the two I2C compatible devices is connected to a second side of the I2C-bus. Referring to FIG. 8, at step 802, the master sends a first command to the first one of the two I2C compatible devices, which is attached to the first side of an I2C-bus, by including the first address in the first command. At step 804, the master sends a second command to the second one of the two I2C compatible devices, which is attached to the second side of the I2C-bus, by including a second address in the second command, wherein the second address in the second command is translated to the first address before the second one of the two I2C compatible devices receives the second command.

The foregoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art. Embodiments were chosen and described in order to best describe the principles of the invention and its practical application, thereby enabling others skilled in the art to understand the invention. Slight modifications and variations are believed to be within the spirit and scope of the present invention. It is intended that the scope of the invention be defined by the following claims and their equivalents.

What is claimed is:

1. A method, comprising:
   (a) receiving an original I2C address;
   (b) translating the original I2C address to a translated I2C address; and
   (c) outputting the translated I2C address;
   wherein step (b) comprises
   subtracting a specified offset value from the original I2C address to produce the translated I2C address,
   adding a specified offset value to the original I2C address to produce the translated I2C address, or
   using a look-up-table to produce the translated I2C address based on the original I2C address, wherein the look-up-table includes a plurality of original I2C addresses and a plurality of translated I2C addresses, with each of the translated I2C addresses corresponding to a different one of the original I2C addresses.

2. The method of claim 1, wherein:
   step (a) comprises receiving the original I2C address from a first I2C compatible device via a main side of an I2C-bus to which the first I2C compatible device is connected; and
   step (c) comprises outputting the translated I2C address to a second I2C compatible device via a secondary side of the I2C-bus to which the second I2C compatible device is connected.

3. The method of claim 2, wherein the first I2C compatible device comprises a master device, and the second I2C compatible device comprises a slave device.

4. The method of claim 1, wherein:
   step (b) comprises subtracting an offset value from, or adding an offset value to, the original I2C address to produce the translated I2C address.

5. The method of claim 4, wherein the offset value is specified using one or more terminals, wherein each terminal is selectively connected to a supply voltage rail or ground.

6. The method of claim 4, wherein the offset value is stored.

7. The method of claim 6, wherein the stored offset value is programmable via an I2C-bus.

8. The method of claim 1, wherein:
   step (b) comprises using a look-up-table to produce the translated I2C address based on the original I2C address.

9. The method of claim 8, wherein the look-up-table is programmable via an I2C-bus.

10. A method, comprising:
    (a) receiving an original I2C address;
    (b) using an algorithm to produce the translated I2C address based on the original I2C address; and
    (c) outputting the translated I2C address;
    wherein the algorithm used at step (b) uses at least one of subtraction, addition, multiplication or division to produce the translated I2C address based on the original I2C address.

11. The method of claim 1, wherein at least a portion of the translating at step (b) and at least a portion of the outputting at step (c) are performed before the entire original I2C address is received at step (a).

12. A method for use by a master device to enable the master device to separately send commands to two devices that both have a first address, wherein a first one of the two devices is connected to a first side of an I2C-bus, a second one of the two devices is connected to a second side of the I2C-bus, and an I2C address translator is connected between the first side of the I2C-bus and the second side of the I2C-bus, the method comprising:
(a) sending a first command to the first one of the two devices, which is attached to the first side of an I2C-bus, by including the first address in the first command; and
(b) sending a second command to the second one of the two devices, which is attached to the second side of the I2C-bus, by including in the second command a second address that is different than the first address, wherein the second address in the second command is translated by the I2C address translator to the first address before the second one of the devices receives the second command.

13. The method of claim 12, wherein the master device is also attached to the first side of the I2C-bus.

14. An I2C address translator, comprising:
receive circuitry configured to receive original I2C addresses;
translate circuitry configured to translate the received original I2C addresses to corresponding translated I2C addresses; and
output circuitry configured to output the translated I2C addresses;
wherein different original I2C addresses received by the receive circuitry results in different translated I2C addresses output by the output circuitry; and
wherein the translate circuitry includes
circuitry to subtract an offset value from the original I2C address,
circuitry to add an offset value to the original I2C address, or
a look-up-table that includes a plurality of original I2C addresses and a plurality of translated I2C addresses, with each of the translated I2C addresses corresponding to a different one of the original I2C addresses.

15. The I2C address translator of claim 14, wherein:
the receive circuitry is configured to receive the original I2C address via a main side of a I2C-bus; and
the output circuitry is configured to output the translated I2C address via a secondary side of the I2C-bus.

16. The I2C address translator of claim 14, wherein the translate circuitry comprises:
circuitry that adds an offset value to, or subtracts an offset from, the original I2C address to thereby generate the translated I2C address.

17. The I2C address translator of claim 16, wherein the translate circuitry further comprises circuitry that stores the offset value.

18. The I2C address translator of claim 17, wherein the translate circuitry further comprises circuitry that enables the offset value to be programmed.

19. The I2C address translator of claim 14, wherein the translate circuitry comprises a programmable look-up-table that stores a plurality of original I2C addresses and a corresponding translated address for each of the one or more original I2C addresses.

20. The I2C address translator of claim 14, wherein:
at least a portion of the translation of the original I2C address by the translate circuitry occurs before the entire original I2C address is received by the receive circuitry; and
at least a portion of the translated I2C address is output by the output circuitry before the entire original I2C address is received by the receive circuitry.

21. A system, comprising:
a main side of an I2C-bus;
a plurality of devices connected to the main side of the I2C-bus;
a secondary side of the I2C-bus;
a plurality of devices connected to the secondary side of the I2C-bus; and
an I2C address translator connected between the main side of the I2C-bus and the secondary side of the I2C-bus;
wherein the I2C address translator is configured to
receive an original I2C address via the main side of the I2C-bus from one of the devices connected to the main side of the I2C-bus;
translate the original I2C address to a translated I2C address; and
transmit the translated I2C address via the secondary side of the I2C-bus so that the translated I2C address can be received by the devices connected to the secondary side of the I2C-bus;
wherein the I2C address translator is configured to translate the original I2C address to the translated I2C address by subtracting an offset value from the original I2C address, by adding an offset value to the original I2C address, or using a look-up-table.

22. The system of claim 21, wherein the I2C address translator is configured to translate the original I2C address to the translated I2C address by subtracting an offset value from the original I2C address, or by adding an offset value to the original I2C address.

23. The system of claim 21, wherein the I2C address translator is configured to translate the original I2C address to the translated I2C address using a look-up-table.

24. The system of claim 21, wherein each of the plurality of devices connected to the secondary side of the I2C-bus:
includes an I2C address;
receives the translated I2C address via the secondary side of the I2C-bus; and
compares the translated I2C address to its I2C address.

* * * * *